(12) United States Patent
Hwang

(10) Patent No.: US 11,456,604 B2
(45) Date of Patent: Sep. 27, 2022

(54) TABLE LAMP WITH DOUBLE LIGHT-EMITTING LAMP POLES AND WIRELESS CHARGING BOARD

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 109 days.

(21) Appl. No.: 17/001,713

(22) Filed: Aug. 25, 2020

(65) Prior Publication Data

US 2022/0069597 A1 Mar. 3, 2022

(51) Int. Cl.
*H02J 7/00* (2006.01)
*H02J 50/00* (2016.01)
(Continued)

(52) U.S. Cl.
CPC .............. *H02J 7/0044* (2013.01); *F21S 6/003* (2013.01); *F21V 21/26* (2013.01); *H02J 7/02* (2013.01); *H02J 50/005* (2020.01)

(58) Field of Classification Search
CPC . F21S 6/002; F21S 6/003; F21S 6/006; F21V 21/26; F21V 21/108; F21V 21/116; F21V 21/30; G06F 1/1632; H02J 7/0044; H02J 7/02; H02J 50/005; H02J 50/10; A47B 23/043
See application file for complete search history.

(56) References Cited

U.S. PATENT DOCUMENTS 4,449,169 A * 5/1984 Warshawsky ........... F21S 6/003
362/418
4,881,843 A * 11/1989 Randleman ............. F21V 21/26
403/92
(Continued)

FOREIGN PATENT DOCUMENTS

CN 107062055 A * 8/2017
CN 108071966 A * 5/2018
(Continued)

OTHER PUBLICATIONS

Luo, CN-108071966-A, English (Year: 2018).*
(Continued)

*Primary Examiner* — Jong-Suk (James) Lee
*Assistant Examiner* — James M Endo
(74) *Attorney, Agent, or Firm* — Bacon & Thomas, PLLC

(57) ABSTRACT

A table lamp with double light-emitting lamp poles and a wireless charging board includes a base, a lamp arm erected from the top of the base, and two light-emitting lamp poles pivotally connected to the top of the lamp arm, and the two light-emitting lamp poles can be placed side by side with each other or spread out into a fan shape to adjust the lighting area, and a wireless charging board is arranged at the front of the base and provided for an external mobile device to be set obliquely for charging, and a display screen of the mobile device is facing towards the front to facilitate the viewing by users.

13 Claims, 10 Drawing Sheets

(51) Int. Cl.
*F21S 6/00* (2006.01)
*H02J 7/02* (2016.01)
*F21V 21/26* (2006.01)

(56) References Cited

U.S. PATENT DOCUMENTS

| | | | | |
|---|---|---|---|---|
| 6,279,753 | B1* | 8/2001 | Swanson | G11B 33/0411 |
| 6,416,207 | B1* | 7/2002 | Chang | F21V 21/26 |
| | | | | 362/418 |
| 6,897,785 | B2* | 5/2005 | Corbus | G08B 5/36 |
| | | | | 362/183 |
| 8,256,925 | B2* | 9/2012 | Yuan | F21V 21/06 |
| | | | | 362/249.07 |
| 10,539,306 | B1 | 1/2020 | Hwang | |
| 10,601,973 | B1* | 3/2020 | Raghunathan | H04M 1/04 |
| 2004/0090781 | A1* | 5/2004 | Yeoh | F21V 21/30 |
| | | | | 362/427 |
| 2005/0052875 | A1* | 3/2005 | Liang | F21V 14/02 |
| | | | | 362/399 |
| 2005/0225287 | A1* | 10/2005 | Yang | H04M 1/04 |
| | | | | 320/114 |
| 2006/0209530 | A1* | 9/2006 | Schaak | G11B 33/06 |
| | | | | 362/86 |
| 2007/0035917 | A1* | 2/2007 | Hotelling | H02J 50/90 |
| | | | | 361/679.56 |
| 2007/0047218 | A1* | 3/2007 | Hsieh | A61L 9/22 |
| | | | | 362/411 |
| 2007/0097689 | A1* | 5/2007 | Barausky | F21V 33/0052 |
| | | | | 362/410 |
| 2009/0161374 | A1* | 6/2009 | Teng | F21V 21/26 |
| | | | | 362/427 |
| 2010/0090085 | A1* | 4/2010 | Corrion | F16M 11/38 |
| | | | | 248/459 |
| 2010/0238644 | A1* | 9/2010 | Huang | F21V 23/04 |
| | | | | 362/33 |
| 2011/0157904 | A1* | 6/2011 | Yuan | F21V 21/30 |
| | | | | 362/428 |
| 2011/0180682 | A1* | 7/2011 | Tarnutzer | A47B 23/043 |
| | | | | 248/447 |
| 2011/0286208 | A1* | 11/2011 | Chen | F21V 21/30 |
| | | | | 362/217.1 |
| 2012/0163004 | A1* | 6/2012 | Hsia | F21V 21/30 |
| | | | | 362/418 |
| 2012/0201038 | A1* | 8/2012 | Birnstock | F21V 19/04 |
| | | | | 362/382 |
| 2013/0058036 | A1* | 3/2013 | Holzer | H04M 1/04 |
| | | | | 361/679.44 |
| 2014/0152244 | A1* | 6/2014 | Rautiainen | H02J 7/025 |
| | | | | 320/108 |
| 2014/0285008 | A1* | 9/2014 | Azancot | H02J 50/40 |
| | | | | 307/104 |
| 2016/0153650 | A1* | 6/2016 | Chien | F21V 33/0004 |
| | | | | 362/253 |
| 2017/0067625 | A1* | 3/2017 | Edgar | F21S 6/002 |
| 2017/0248296 | A1* | 8/2017 | Sekowski | F21S 8/086 |
| 2017/0299124 | A1* | 10/2017 | Hsu | F21K 9/20 |
| 2017/0370564 | A1* | 12/2017 | Fletcher | F21V 21/30 |
| 2018/0191096 | A1* | 7/2018 | Hoshikawa | H01R 33/74 |
| 2018/0356078 | A1* | 12/2018 | Rolf | F21V 23/001 |
| 2019/0032876 | A1* | 1/2019 | Jan | H02J 7/0044 |
| 2019/0036359 | A1* | 1/2019 | Smith | H02J 7/35 |
| 2019/0390826 | A1* | 12/2019 | Yang | F21S 6/002 |
| 2020/0208659 | A1* | 7/2020 | Wachtel | F16B 2/12 |

FOREIGN PATENT DOCUMENTS

| | | | |
|---|---|---|---|
| CN | 112097153 A | * | 12/2020 |
| KR | 20070094124 A | * | 9/2007 |
| KR | 20100010649 U | * | 10/2010 |
| KR | 20140095682 A | * | 8/2014 |
| KR | 20150063715 A | * | 6/2015 |

OTHER PUBLICATIONS

Yin, CN-112097153-A, English (Year: 2020).*
Zhang, CN-107062055-A, English (Year: 2017).*
KR649, KR-20100010649-U, English (Year: 2010).*
Lim, KR-20150063715-A, English (Year: 2015).*
Kim, KR-20070094124-A, English (Year: 2007).*
KR682, KR-20140095682-A, English (Year: 2014).*

* cited by examiner

TABLE LAMP WITH DOUBLE LIGHT-EMITTING LAMP POLES AND WIRELESS CHARGING BOARD

FIELD OF THE INVENTION

The present invention relates to a table lamp with two light-emitting lamp poles and a wireless charging board, and the two light-emitting lamp poles are provided for adjusting a lighting area and the wireless charging board is set obliquely for charging an external mobile device, and a display screen of the external mobile device facing towards the front is provided for facilitating the viewing of the display screen by users.

BACKGROUND OF THE INVENTION

In addition to putting a table lamp and a computer on a desk, an office desk, or a working table, users may also need to charge various mobile devices such as a tablet PC and a smart phone, so that some manufacturers install a wireless charging board in a lamp base of the table lamp to let the mobile device be charged by the wireless charging board of the table lamp directly. Besides the original lighting function, the table lamp further adds the charging function to improve the added value of the product.

However, when the mobile device is placed flatly on the lamp base and charged by the wireless charging board, the display screen of the mobile device is facing upward, so that the users cannot view the display screen directly. If the users need to read information such as a missed call, the time, or a message from the mobile device, then the users will have to pick up the mobile device before reading the information on the display screen, and thus causing an interrupt of the charge and an inconvenience of the use. In view of the drawbacks of the prior art, the inventor of the present invention discloses a table lamp with a wireless charging board, so that when the mobile device is placed on a table lamp and charged wirelessly, the users can view the display screen of the mobile device directly to improve the convenience of use.

In addition, a conventional table lamp generally has one lampshade, and the lighting area cannot be adjusted, so that the inventor of the present invention has filed the U.S. Pat. No. 10,539,306 entitled "DOUBLE LAMPSHADE TABLE LAMP", wherein two lampshades are provided for adjusting the lighting area, and the users can view the mobile device while the mobile device is being charged, and when the mobile device is placed on such table lamp, the function of the table lamp can be improved further.

SUMMARY OF THE INVENTION

Specifically, the present invention is directed to a table lamp with double light-emitting lamp poles and a wireless charging board, comprising: a base, a lamp arm erected from the rear of the top of the base, and two light-emitting lamp poles pivotally coupled to the top of the lamp arm, wherein the top of the lamp arm has a pivoting seat, and rear ends of the two light-emitting lamp poles are respectively and pivotally coupled to both sides of the pivoting seat, so that the two light-emitting lamp poles are situated at the same height, and the two light-emitting lamp poles are deflectable relative to the pivoting seat and set next to each other to focus the lighting or deflected sideway and spread into a fan shape to increase a lighting area, and the wireless charging board is disposed obliquely at the front of the top of the base and provided for setting the back of an external mobile device obliquely on the wireless charging board to charge the external device, and a display screen of the external mobile device is facing forward to facilitate users to view the display screen, and a propping plate is protruded from the bottom edge of the front of the wireless charging board and provided for abutting the bottom of the external mobile device to prevent the external mobile device from sliding.

Compared with the prior art, the present invention has the design of two light-emitting lamp poles and a wireless charging board obliquely set at the front of the base, and this design not just can adjust the lighting area by the two light-emitting lamp poles only, but also can charge the external mobile device by the obliquely set wireless charging board. In addition, the display screen of the external mobile device is facing towards the front to facilitate users to view the display screen.

DESCRIPTION OF THE PREFERRED EMBODIMENTS

The objectives, technical characteristics and effects of the present invention will become apparent with the detailed description of preferred embodiments accompanied with the illustration of related drawings. It is intended that the embodiments and drawings disclosed herein are to be considered illustrative rather than restrictive.

Figure 1:
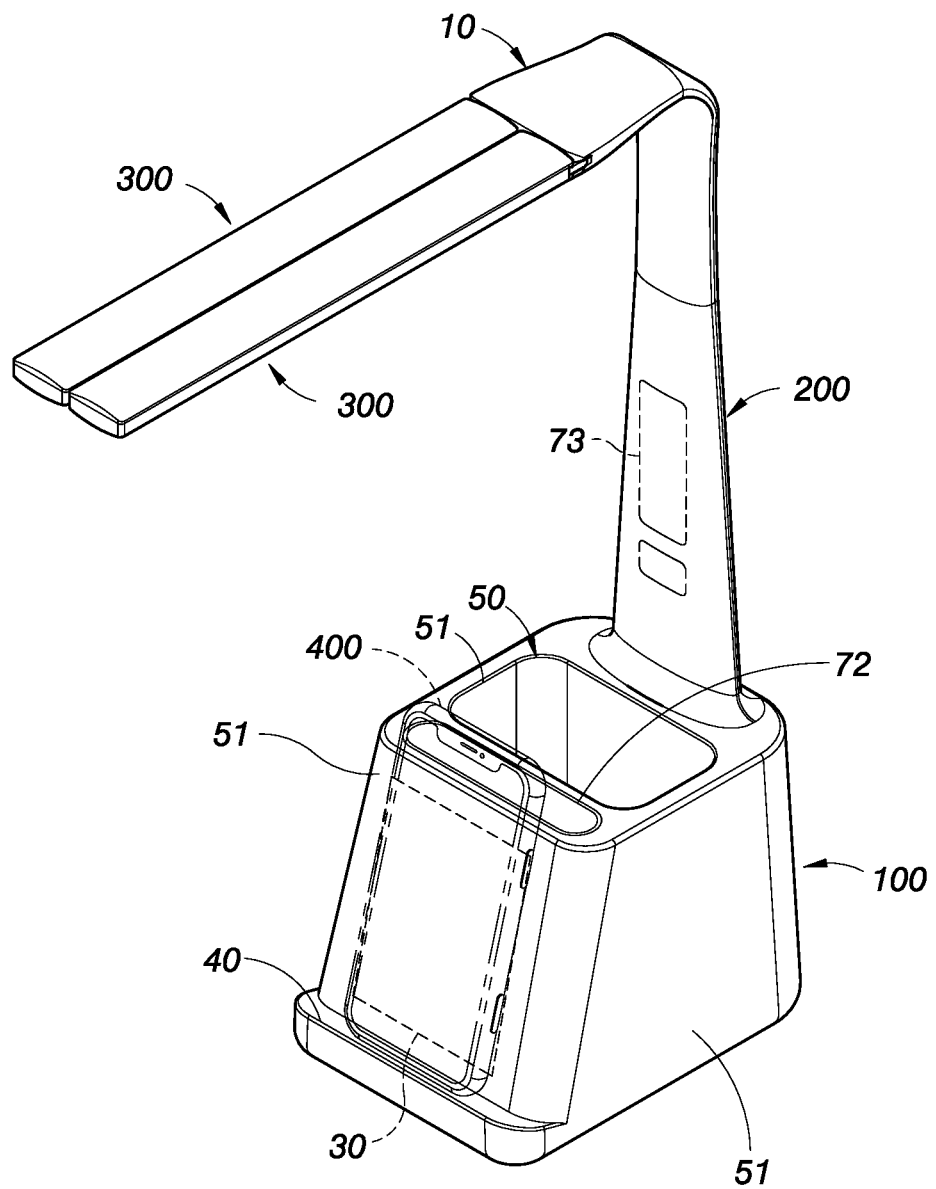
FIG. 1 is a perspective view of a first embodiment of the present invention.
Figure 2:
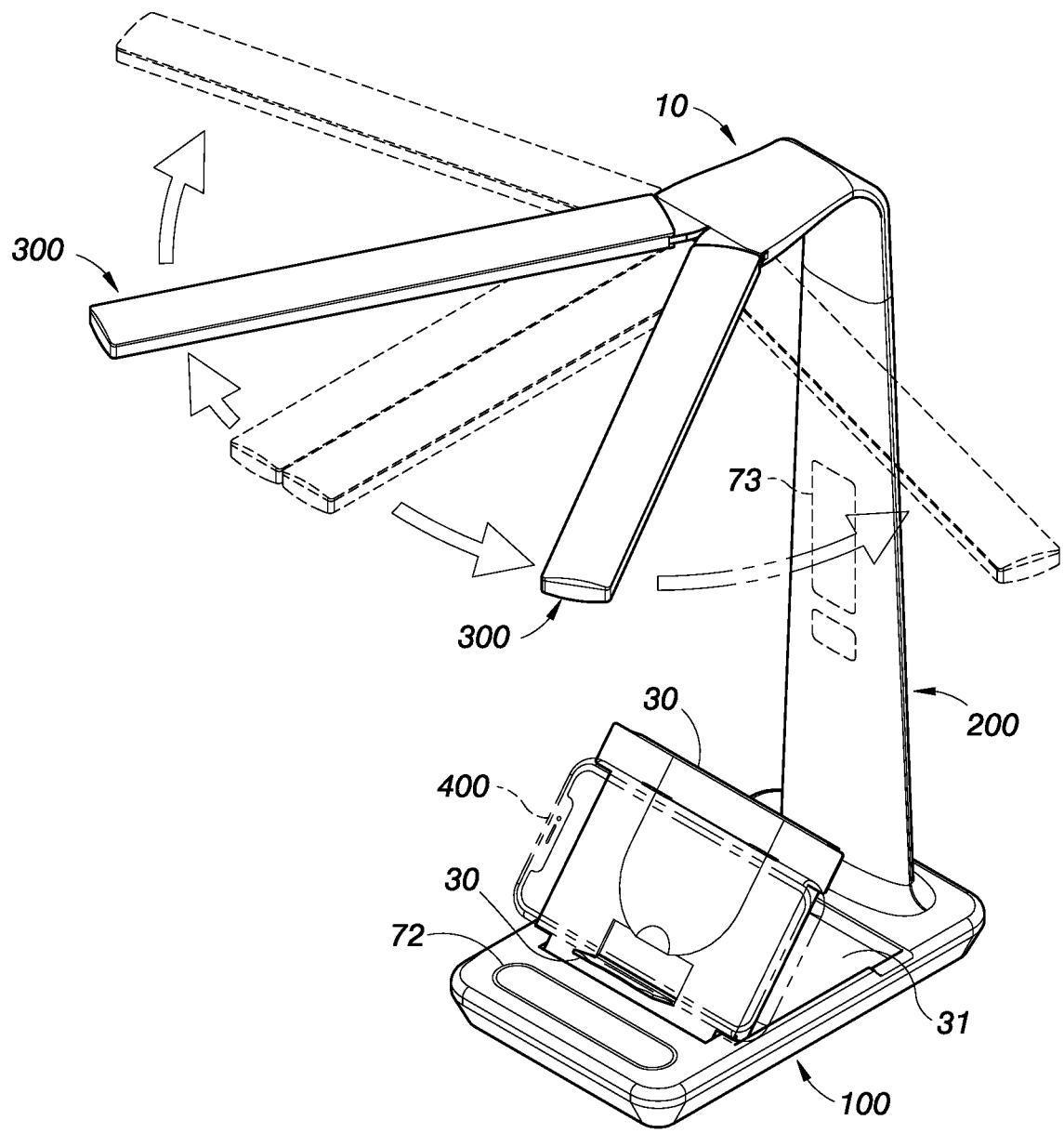
FIG. 2 is a perspective view of a second embodiment of the present invention.
Figure 3:
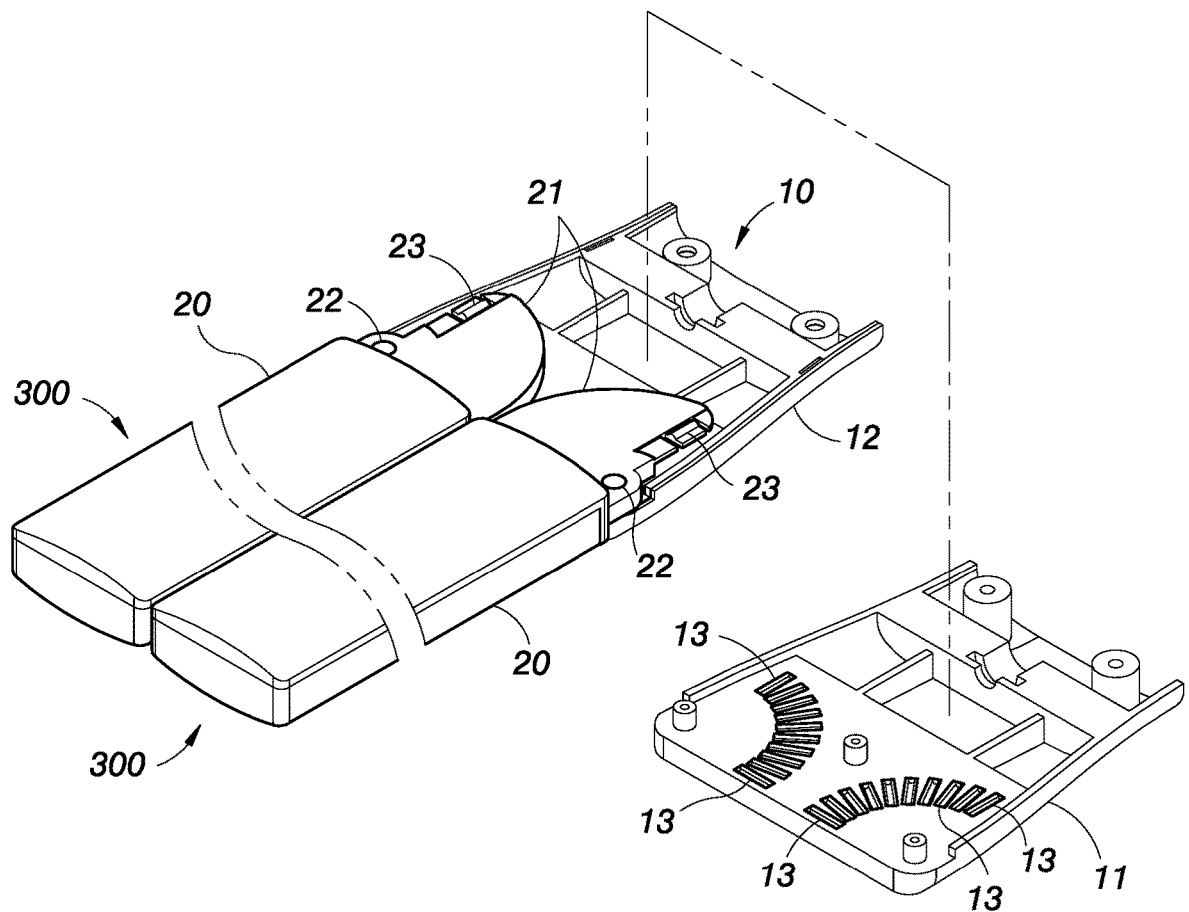
FIG. 3 is an exploded view of the present invention, showing two light-emitting lamp poles and a pivoting seat.

In FIGS. 1 and 2, the present invention discloses a table lamp with double light-emitting lamp poles and a wireless charging board, comprising a base 100, a lamp arm 200 erected from the rear of the top of the base 100, and two light-emitting lamp poles 300 pivotally coupled to the top of the lamp arm 200.

With reference to FIGS. 3 to 6 in conjunction with FIGS. 1 and 2, the top of the lamp arm 200 has a pivoting seat 10, and the pivoting seat 10 comprises upper and lower casings 11, 12 engaged with each other; and the two light-emitting lamp poles 300 comprise a light-emitting portion 20 disposed at the front end and a pivotal plate 21 disposed at the rear end, and the two pivotal plates 21 have a shaft 22 pivotally coupled between the upper and lower casings 11, 12, so that the two light-emitting lamp poles 300 are situated at the same height, and the light-emitting portions 20 of the two light-emitting lamp poles 300 can be deflected by using the two shafts 22 as axes.

Figure 4:
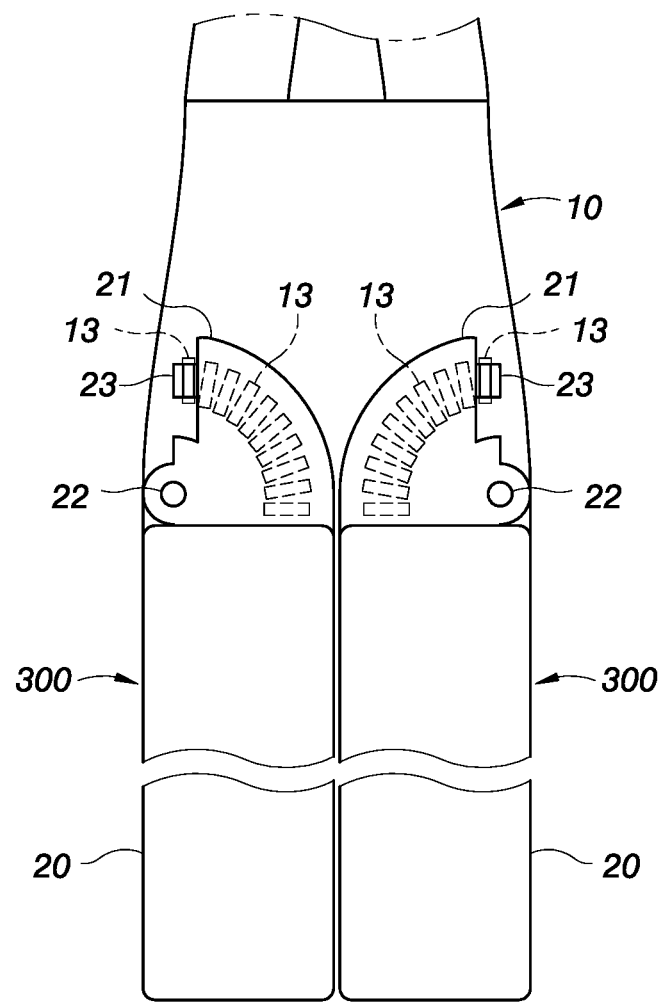
FIG. 4 is schematic view of combining elastic protrusions of two light-emitting lamp poles with limit recessions of a pivoting seat of the present invention.

In the figures, the lamp arm 200 can be bent to allow the pivoting seat 10 to face towards the front, so that the two light-emitting lamp poles 300 on the pivoting seat 10 are substantially arranged in a horizontal direction and provided for projecting light towards the top of a table. The two light-emitting lamp poles 300 can be deflected from 0 degree to positive or negative 95 degrees relative to the upper and lower casings 11, 12 respectively. For example, when the two light-emitting lamp poles 300 as shown in FIG. 4 are set close to each other to focus the lighting, the relative position of each light-emitting lamp pole 300 and the upper and lower casings is 0 degree, and the included angle between the two light-emitting lamp poles 300 is 0 degree.

Figure 5:
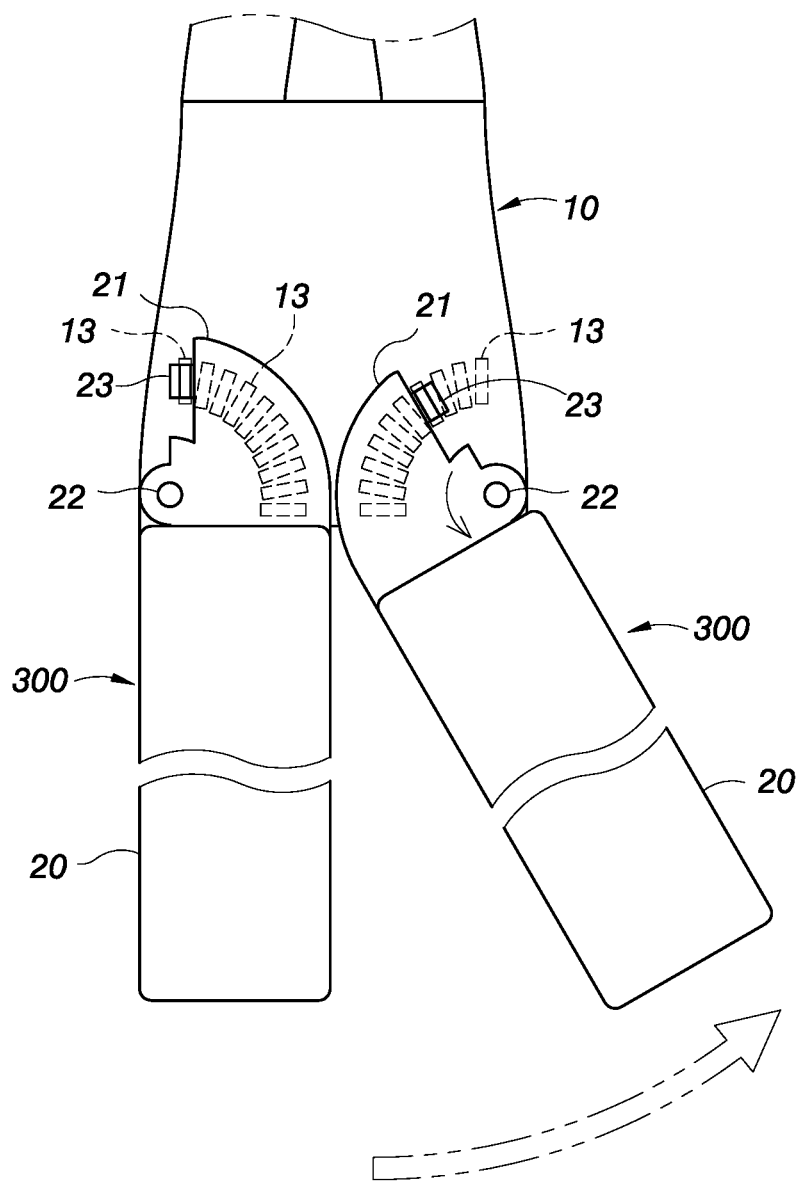
FIG. 5 is a schematic view of the present invention, when one of the light-emitting lamp poles is deflected.
Figure 6:
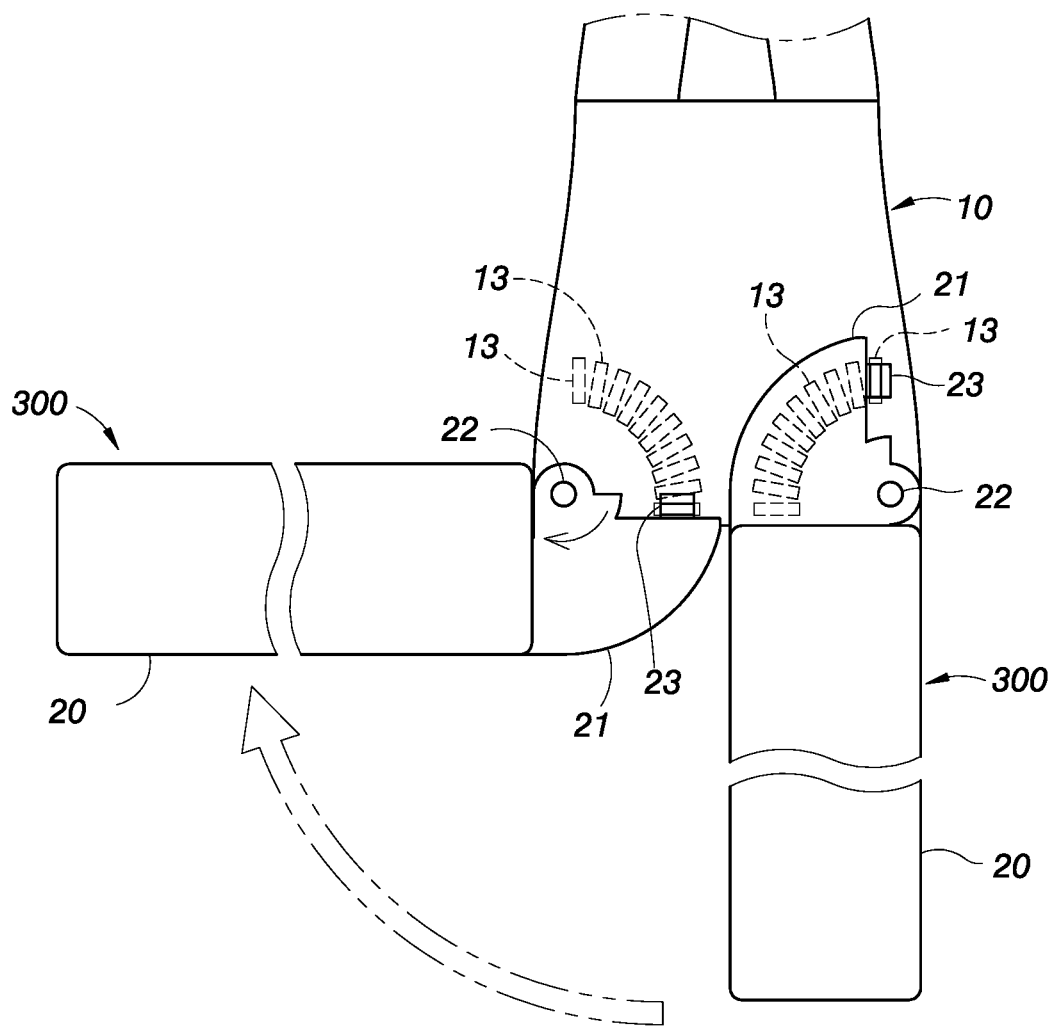
FIG. 6 is another schematic view of the present invention, when the other one of the light-emitting lamp poles is deflected.

In FIGS. 5 and 6, the two light-emitting lamp poles 300 are deflected sideway and spread into a fan shape by using the two shafts 22 as axes, so that when the two light-emitting lamp poles 300 are deflected and spread into the fan shape with a maximum spreading angle, the relative positions of the two light-emitting lamp poles 300 and the upper and lower casings are approximately positive 95 degrees and negative 95 degrees respectively, and the included angle between the two light-emitting lamp poles 300 is approximately 190 degrees, so as to increase the lighting area. In actual use, users can adjust the included angle between the two light-emitting lamp poles 300 freely as needed.

In an embodiment, the upper casing 11 or the lower casing 12 has a plurality of limit recessions 13 arranged with an interval apart from each other, and the plurality of limit recessions 13 are arranged equiangularly into an arc shape by using the shaft 22 as center. For example, the plurality of limit recessions 13 as shown in FIGS. 5 and 6 are formed on the upper casing 11 and arranged with an increment of 10 degrees apart from each other. In other embodiments, the increment can also be 5 degrees, 12.5 degrees, 15 degrees, etc.

The pivotal plate 21 has an elastic protrusion 23 configured to be corresponsive to the plurality of limit recessions 13, so that after the light-emitting portions 20 of the two light-emitting lamp poles 300 are deflected by using the two shafts 22 as axes, the two elastic protrusions 23 can be latched into any one of the limit recessions 13 of the corresponding position for positioning to further allow the two light-emitting lamp poles 300 to be deflected freely to different angles and positioned to meet the users' requirement. In this embodiment, the maximum included angle between the two light-emitting lamp poles 300 is approximately 180 degrees.

In FIGS. 1 and 2, a wireless charging board 30 is set obliquely at the front of the top of the base 100 and provided for the back of an external mobile device 400 to be set obliquely on the wireless charging board 30 for charging and allow a display screen of the external mobile device 400 to face towards the front in order to facilitate users to view the display screen. In addition, a propping plate 40 is protruded from the front top edge of the wireless charging board 30 and provided for abutting the bottom edge of the external mobile device 400 to prevent the external mobile device 400 from sliding.

In an embodiment, the wireless charging board 30 can be fixed to the top of the base 100 as shown in FIG. 1 or folded and stacked on the top of the base 100 as shown in FIGS. 7 to 12.

With reference to FIG. 1 for the first embodiment of the present invention, the top of the base 100 further has a container 50 for containing external objects, and the container 50 has a siding 51 surrounding the container 50, and the wireless charging board 30 is disposed in the siding 51 at the front of the container 50 to constitute a part of the front siding 51 of the container 50. In this embodiment, the propping plate 40 is fixed to the front top edge of the front siding 51 to allow users to set the external mobile device 400 directly at the front of the container 50 for charging the external mobile device 400 by the wireless charging board 30, while the users are viewing the display screen of the mobile device. Further, the propping plate 40 is provided for abutting against the bottom edge of the external mobile device 400 to prevent the external mobile device 400 from sliding while the users are viewing the display screen.

With reference to FIG. 2 and FIGS. 7 to 12, the difference of the second and third embodiments from the first embodiment of the present invention resides on that the base 100 is substantially in a flat square shape and has a groove 31 in a shape substantially the same as the wireless charging board 30 and formed at the top of the base 100, and both sides of the bottom of the wireless charging board 30 have a pivot 32 respectively and pivotally coupled to both sides of the front edge of the groove 31, so that the wireless charging board 30 can be pivoted forward relative to the groove 31 by using the two pivots 32 as axes and set obliquely at the front of the top of the base 100, or pivoted backward and folded and stacked into the groove 31 to resume the original flat shape of the base 100.

Figure 7:
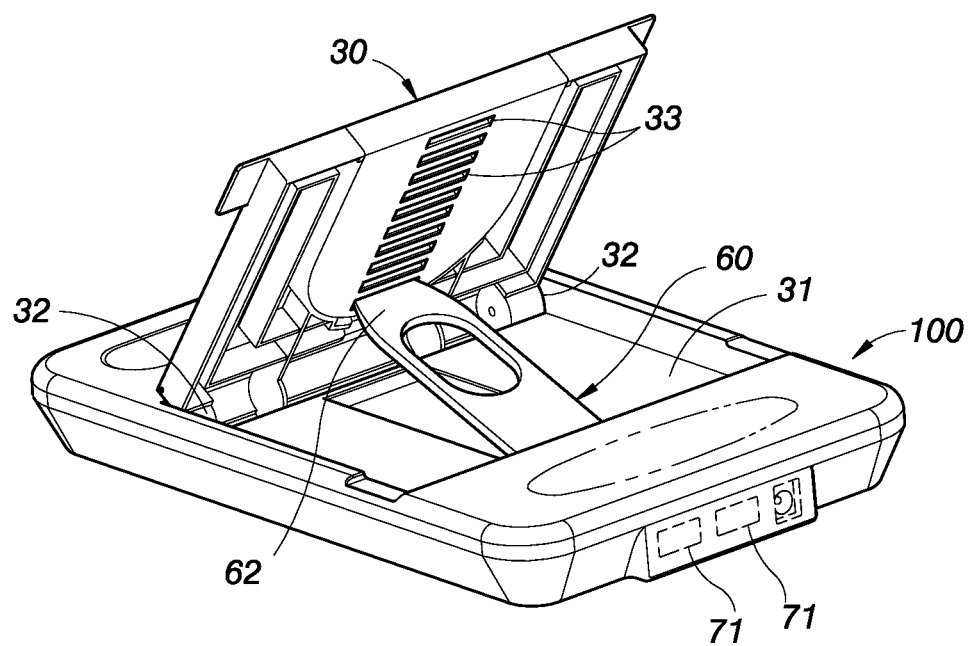
FIG. 7 is a perspective view of the second embodiment of the present invention, showing that the wireless charging board is set obliquely.
Figure 8:
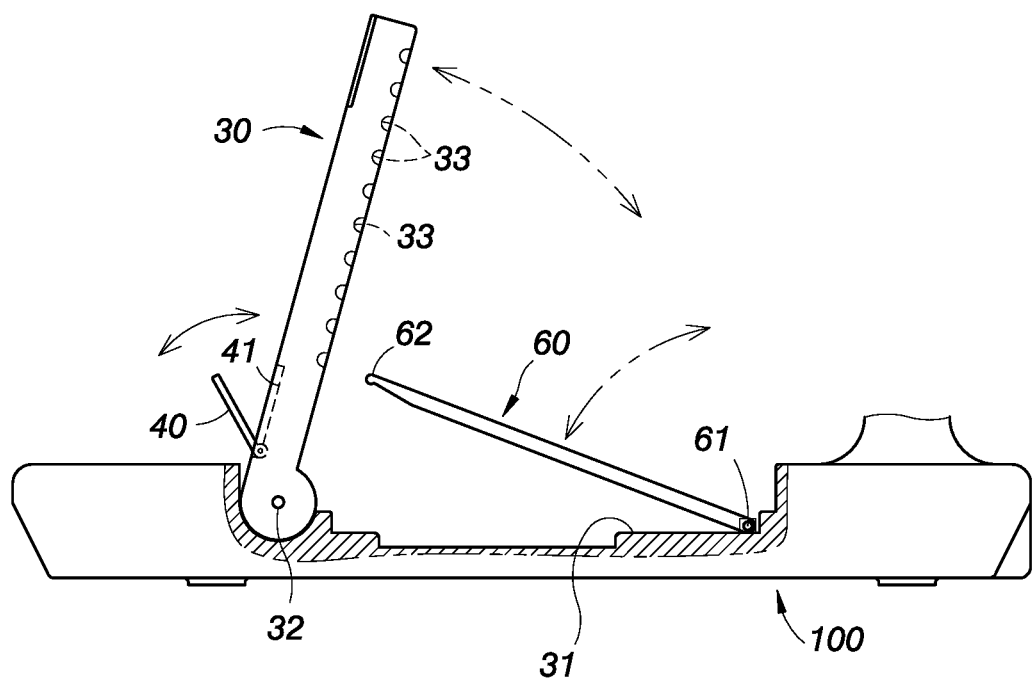
FIG. 8 is a side view showing the structure of the second embodiment of the present invention.
Figure 9:
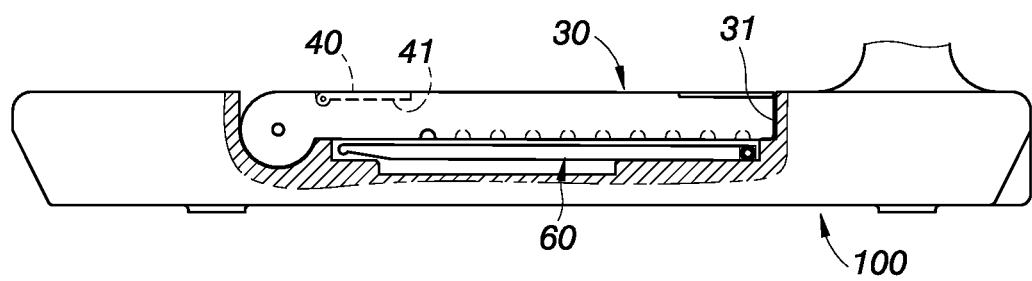
FIG. 9 is a schematic view of closing up the wireless charging board and a support plate of the second embodiment of the present invention.

To facilitate users to adjust and fix the angle of inclination of the wireless charging board 30, a support plate 60 is installed between the wireless charging board 30 and the groove 31 of the base 100 as shown in FIGS. 7 to 9, and both ends of the support plate 60 are a pivot end 61 and a support end 62 respectively, and the pivot end 61 of the support plate 60 is pivotally coupled to the rear edge of the groove 31, so that the support end 62 of the support plate 60 can be pivotally spread relative to the groove 31 by using the pivot end 61 as axis to abut against the back of the wireless charging board 30.

The back of the wireless charging board 30 has a plurality of positioning recessions 33 arranged with an interval apart from each other, and after the support plate 60 is pivotally spread, the support end 62 can abut against any one positioning recession 33 to adjust and fix the angle of inclination of the groove 31 relative to the wireless charging board 30 as shown in FIGS. 7 and 8, or the wireless charging board 30 and the support plate 60 are pivotally folded and stacked into the groove 31 to resume the original flat shape of the base 100 as shown in FIG. 9.

Figure 10:
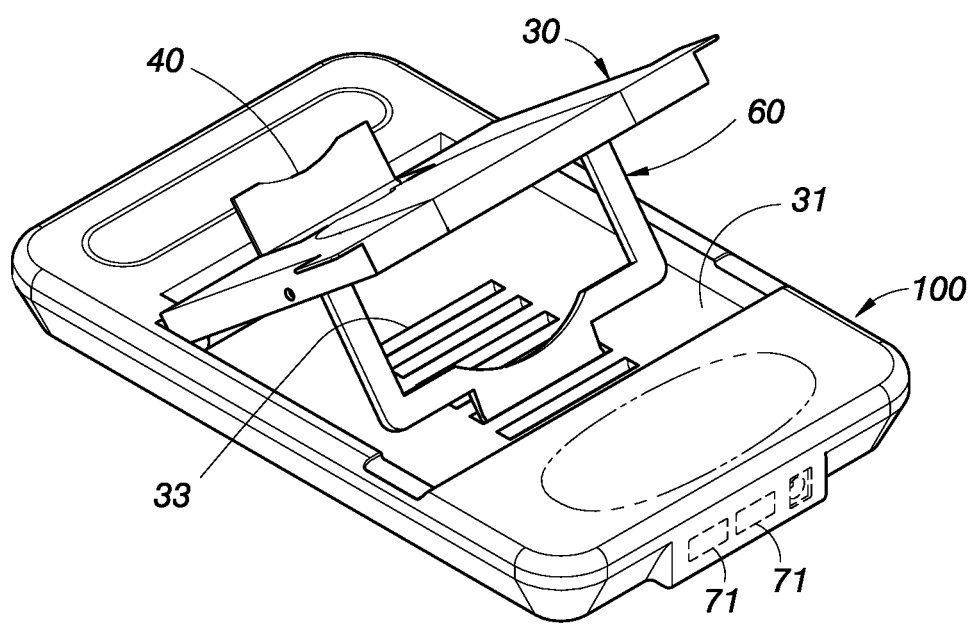
FIG. 10 is a perspective view of a third embodiment of the present invention, showing that the wireless charging board is set obliquely.
Figure 11:
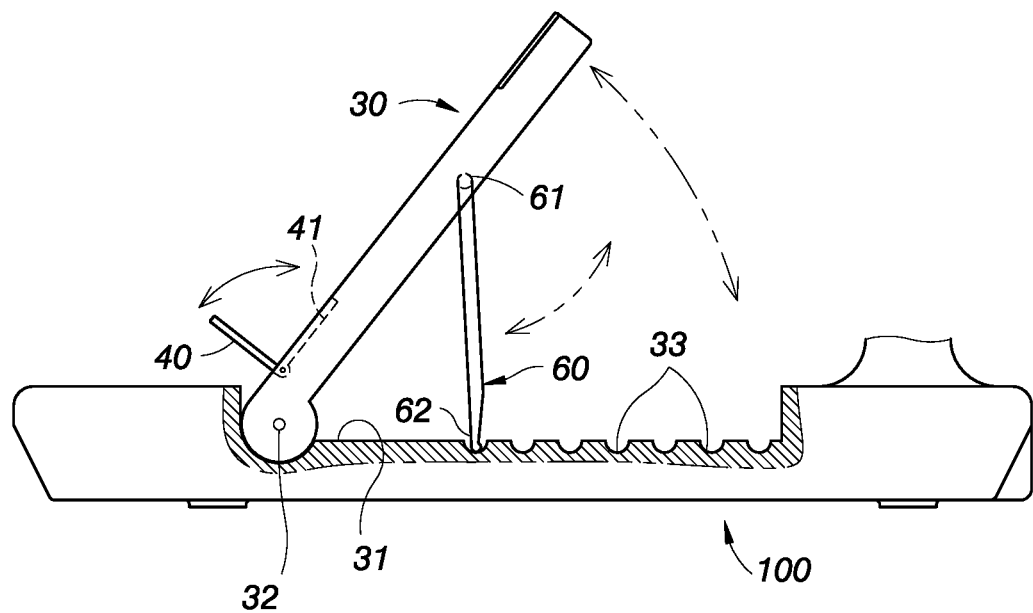
FIG. 11 is a side view of the third embodiment of the present invention.
Figure 12:
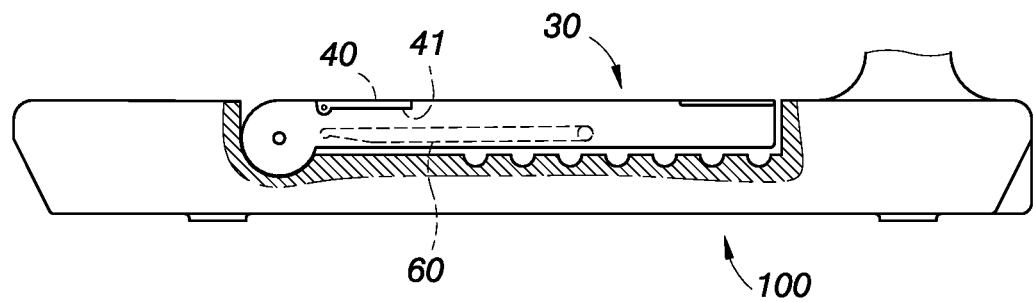
FIG. 12 is a schematic view of closing up the wireless charging board and a support plate of the third embodiment of the present invention.

With reference to FIGS. 10 to 12 for a support plate 60 and a positioning recession 33 of another embodiment, the pivot end 61 of the support plate 60 is pivotally coupled to the middle section of the back of the wireless charging board 30, and the positioning recessions 33 are arranged with an interval apart from each other and at the groove bottom of the groove 31.

After the support plate 60 is pivotally spread relative to the wireless charging board 30, the support end 62 of the support plate 60 can abut against any one positioning recession 33 of the groove 31 to achieve the same effect of adjusting and fixing the angle of inclination of the wireless charging board 30.

In an embodiment as shown in FIGS. 7 to 12, the front of the wireless charging board 30 has a depression 41 in a shape substantially the same as the propping plate 40, and the bottom edge of the propping plate 40 is pivotally coupled to the top edge of the depression 41, so that the propping plate 40 can be pivotally spread forward relative to the depression 41 and protruded from the front of the wireless charging board 30, or pivotally folded backward and accommodated into the depression 41, so that when the wireless charging board 30 and the support plate 60 are folded into the groove 31 if the base 100, the propping plate 40 is folded into the depression 41 to maintain the flatness and smoothness of the top of the base 100.

In FIGS. 1 to 3, 7, and 10, the base 100 of the table lamp has a USB jack 71 and a touch switch 72, and the touch switch 72 is provided for controlling the color temperature and brightness of the light-emitting portion 20 of the two light-emitting lamp poles 300, and the lamp arm 200 has an LED display screen 73 for displaying information such as date, time, temperature, etc.

While the invention has been described by means of specific embodiments, numerous modifications and variations could be made thereto by those skilled in the art without departing from the scope and spirit of the invention as set forth in the claims.

What is claimed is:

1. A table lamp with double light-emitting lamp poles and a wireless charging board, comprising: a base, a lamp arm erected from the rear of the top of the base, and two light-emitting lamp poles pivotally coupled to the top of the lamp arm, wherein the top of the lamp arm has a pivoting seat, and rear ends of the two light-emitting lamp poles are respectively and pivotally coupled to both sides of the pivoting seat, such that the two light-emitting lamp poles are situated at the same height, and the two light-emitting lamp poles are deflectable relative to the pivoting seat and placed adjacent to each other to focus the lighting or deflected sideway and spread into a fan shape to increase a lighting area, and the wireless charging board is disposed obliquely at the front of the top of the base and provided for the back of an external mobile device to be set obliquely on the wireless charging board for charging, and a display screen of the external mobile device is facing forward to facilitate users to view the display screen, and a propping plate is protruded from a bottom edge of the front of the wireless charging board and provided for abutting the bottom of the external mobile device to prevent the external mobile device from sliding;

wherein the pivoting seat comprises upper and lower casings engaged with each other; the two light-emitting lamp poles comprise a light-emitting portion disposed at the front end and a pivotal plate disposed at the rear end, and the two pivotal plates have a shaft pivotally coupled between the upper and lower casings; and the upper casing or lower casing have two sets of limit recessions equiangularly arranged into an arc shape by using the shaft of each of the two pivotal plates as a center, and the two pivotal plates have an elastic protrusion configured to be corresponsive to each of the two sets of the limit recessions respectively, so that after the light-emitting portions of the two light-emitting lamp poles are deflected by using the two shafts as axes, the elastic protrusions can be latched into any one limit recession for positioning;

wherein the top of the base further has a container with a siding around the container for containing an external object, and the wireless charging board is installed inside the siding at the front side of the container to form a part of the siding of the container; and wherein the propping plate is fixed and installed at the front top edge of the front siding.

2. The table lamp with the double light-emitting lamp poles and the wireless charging board as claimed in claim 1, wherein the pivoting seat comprises a group of upper and lower casings engaged with each other; each of the two light-emitting lamp poles has a light-emitting portion disposed at a front end and a pivotal plate disposed at a rear end respectively, and each of the two pivotal plates has a shaft pivotally coupled between the upper and lower casings, so that light-emitting portions of the two light-emitting lamp poles are deflected by using the two shafts as axes.

3. The table lamp with the double light-emitting lamp poles and the wireless charging board as claimed in claim 2, wherein the top of the base further has a container including a siding disposed around the container and provided for containing external objects, and the wireless charging board is disposed in the siding at the front side of the container to form a part of a front wall of the container.

4. The table lamp with the double light-emitting lamp poles and the wireless charging board as claimed in claim 3, wherein the propping plate is fixed to the lower front edge of the front siding.

5. The table lamp with the double light-emitting lamp poles and the wireless charging board as claimed in claim 2, wherein the top of the base has a groove in a shape substantially the same as the wireless charging board and both sides of the bottom of the wireless charging board have a pivot pivotally coupled to both front edges of the groove respectively, so that the wireless charging board can be pivoted forward relative to the groove by using the two pivots as axes and set obliquely on the top of the front of the base backward or pivoted backward and folded and stacked into the groove.

6. The table lamp with the double light-emitting lamp poles and the wireless charging board as claimed in claim 5, further comprising a support plate installed between the wireless charging board and the groove of the base, and both ends of the support plate being a pivot end and a support end respectively, and the pivot end of the support plate being pivoted to the rear of the groove, so that the support end of the support plate can be pivotally spread relative to the groove by using the pivot end as axis to abut against the back of the wireless charging board and fix angle of inclination of the wireless charging board, or pivotally folded and stacked into the groove; or the pivot end of the support plate being pivoted to the back of the wireless charging board, so that the support end of the support plate can be pivotally spread relative to the wireless charging board by using the pivot end as axis to abut against the groove and fix the angle of inclination of the wireless charging board or pivotally folded and stacked on the back of the wireless charging board.

7. The table lamp with the double light-emitting lamp poles and the wireless charging board as claimed in claim 6, wherein the pivot end of the support plate is pivotally coupled to the rear edge of the groove of the base, and the back of the wireless charging board has a plurality of positioning recessions arranged with an interval apart from each other, and the support end of the support plate is pivotally spread to abut against any one of the positioning recessions in order to adjust and fix the angle of inclination of the wireless charging board relative to the groove.

8. The table lamp with the double light-emitting lamp poles and the wireless charging board as claimed in claim 6, wherein the pivot end of the support plate is pivotally coupled to the middle section of the back of the wireless charging board, and the bottom of the groove has a plurality of positioning recessions arranged with an interval apart from each other, and the support end of the support plate is pivotally spread to abut against any one of the positioning recessions in order to adjust and fix the angle of inclination of the wireless charging board relative to the groove.

9. The table lamp with the double light-emitting lamp poles and the wireless charging board as claimed in claim 6, wherein the front of the wireless charging board has a depression in a shape substantially the same as the propping plate, and the bottom edge of the propping plate is pivotally coupled to the bottom edge of the depression, so that the propping plate can be pivotally spread forward relative to the depression and protruded from the front of the wireless charging board, or pivotally folded and accommodated into the depression.

10. A table lamp with double light-emitting lamp poles and a wireless charging board, comprising: a base, a lamp arm erected from the rear of the top of the base, and two light-emitting lamp poles pivotally coupled to the top of the lamp arm, wherein the top of the lamp arm has a pivoting seat, and rear ends of the two light-emitting lamp poles are respectively and pivotally coupled to both sides of the pivoting seat, such that the two light-emitting lamp poles are situated at the same height, and the two light-emitting lamp poles are deflectable relative to the pivoting seat and placed adjacent to each other to focus the lighting or deflected sideway and spread into a fan shape to increase a lighting area, and the wireless charging board is disposed obliquely at the front of the top of the base and provided for the back of an external mobile device to be set obliquely on the wireless charging board for charging, and a display screen of the external mobile device is facing forward to facilitate users to view the display screen, and a propping plate is protruded from a bottom edge of the front of the wireless charging board and provided for abutting the bottom of the external mobile device to prevent the external mobile device from sliding;
   wherein the pivoting seat comprises upper and lower casings engaged with each other; the two light-emitting lamp poles comprise a light-emitting portion disposed at the front end and a pivotal plate disposed at the rear end, and the two pivotal plates have a shaft pivotally coupled between the upper and lower casings; and the upper casing or lower casing have two sets of limit recessions equiangularly arranged into an arc shape by using the shaft of each of the two pivotal plates as a center, and the two pivotal plates have an elastic protrusion configured to be corresponsive to each of the two sets of the limit recessions respectively, so that after the light-emitting portions of the two light-emitting lamp poles are deflected by using the two shafts as axes, the elastic protrusions can be latched into any one limit recession for positioning;
   wherein the top of the base has a groove in a shape substantially the same as the wireless charging board, and both sides of the bottom of the wireless charging board have a pivot respectively and pivotally coupled to both sides of the front edge of the groove, so that the wireless charging board can be pivoted forward relative to the groove by using the two pivots as axes and set obliquely at the front of the top of the base or pivoted backward and folded and stacked into the groove; and
   a support plate installed between the wireless charging board and the groove of the base, the support plate being pivoted to the rear of the groove to abut against the back of the wireless charging board and fix angle of inclination of the wireless charging board.

11. The table lamp with the double light-emitting lamp poles and the wireless charging board as claimed in claim 10, wherein the pivot end of the support plate is pivotally coupled to the rear edge of the groove of the base, and the back of the wireless charging board has a plurality of positioning recessions arranged with an interval apart from each other, and the support end of the support plate is pivotally spread to abut against any one positioning recession to adjust and fix the angle of inclination of the wireless charging board relative to the groove.

12. The table lamp with the double light-emitting lamp poles and the wireless charging board as claimed in claim 10, wherein the pivot end of the support plate is pivotally coupled to the middle section of the back of the wireless charging board, and the groove bottom of the groove has a plurality of positioning recessions arranged with an interval apart from each other, and the support end of the support plate is pivotally spread to abut against any one positioning recession to adjust and fix the angle of inclination of the wireless charging board relative to the groove.

13. The table lamp with the double light-emitting lamp poles and the wireless charging board as claimed in claim 10, wherein the front of the wireless charging board has a depression in a shape substantially the same as the propping plate, and the bottom edge of the propping plate is pivotally coupled to the top edge of the depression, so that the propping plate can be pivotally spread forward relative to the depression and protruded from the front of the wireless charging board, or pivotally folded backward and accommodated into the depression.

* * * * *